Nov. 1, 1955 R. H. CHANKALIAN ET AL 2,722,131
VARIABLE SPEED SHEAVE STRUCTURE
Filed Oct. 19, 1950 2 Sheets-Sheet 2
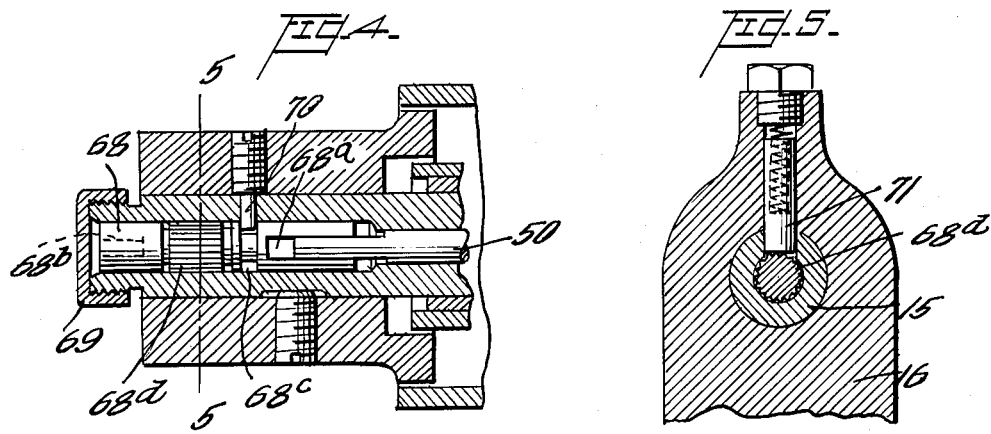
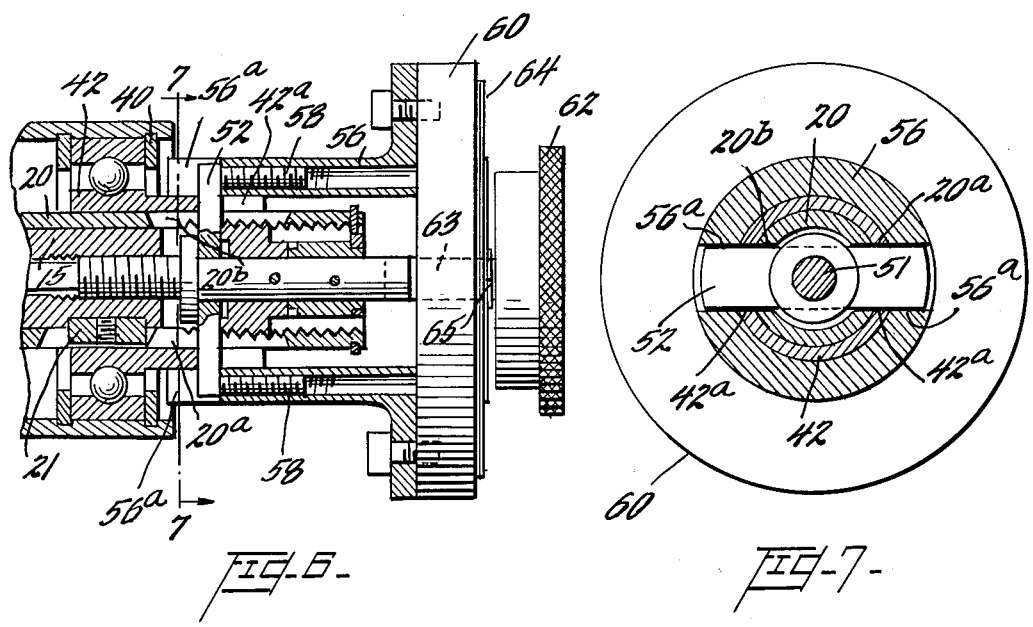
INVENTORS
Robert H. Chankalian
Willard M. Pollock
BY
Watson, Cole, Grindle & Watson
Attorney

# United States Patent Office 2,722,131
Patented Nov. 1, 1955

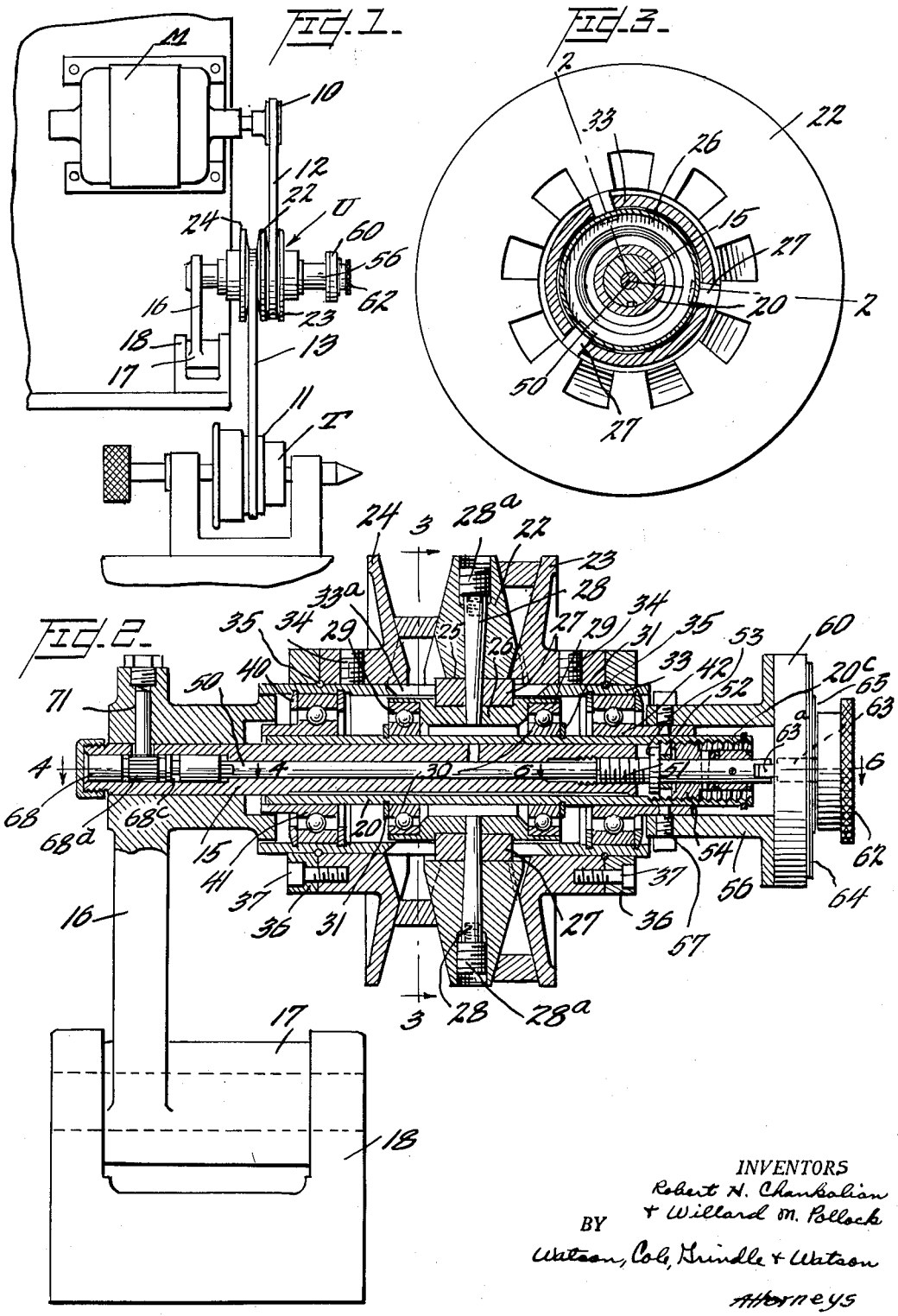

2,722,131

VARIABLE SPEED SHEAVE STRUCTURE

Robert H. Chankalian, Lyndhurst, and Willard M. Pollock, Short Hills, N. J., assignors to American Type Founders, Inc., a corporation of New Jersey Application October 19, 1950, Serial No. 190,988

9 Claims. (Cl. 74—230.17)

This invention relates to variable speed transmission mechanisms, particularly to a mechanism of this type which comprises a permanent driving connection between spaced driving and driven shafts which are mounted for rotation about fixed parallel axes.

The improved transmission comprises means for operatively connecting two such shafts in such manner that, without interrupting the rotation of either shaft, the speed of the driven shaft may be increased or decreased, as desired, without modification of the speed of rotation of the driving shaft, endless belts disposed in parallel planes constituting flexible power transmitting elements, each belt encircling a pulley on one of said shafts and both encircling and operatively engaging an intermediate speed ratio varying unit of novel and improved design and construction. This unit includes a floating supporting shaft, a center sheave member having oppositely facing conical belt engaging surfaces, spaced outer sheave members having mutually facing conical belt engaging surfaces which define, with the belt engaging surfaces of the center sheave members, two V-shaped belt receiving grooves, anti-friction means for rotatably supporting each sheave member upon said shaft, and means for relatively adjusting the sheave members longitudinally of the axis of the floating supporting shaft in such manner that the width of one belt receiving groove will be decreased while the width of the second is being correspondingly increased. The sheave members are supported upon the floating shaft independently of each other so that the relative axial adjustment thereof may be most easily effected, and each sheave member support is so formed that the sheave member mounted thereon is not only mounted for practically frictionless rotation but is firmly supported against tilting due to unbalanced belt pressure exerted against one of its faces and which would unless strongly resisted cause the sheave to wobble as it rotates.

Because of the improved manner in which the sheave members are mounted upon the supporting shaft the possibility that grooves may be formed in that shaft, because of long continued operation of the transmission without change in adjustment, is wholly avoided. This is important inasmuch as the formation of such a groove would interfere with the free adjustment of the sleeve longitudinally of the shaft. Associated with the floating supporting shaft is mechanism for effecting, under the close control of an operator, relative axial adjustment of the sheave members and for maintaining them in any position to which they may be adjusted. This mechanism is compact, simple and effective and in its details is of novel character. The adjusting means may be manipulated directly, by the turning of a knob positioned close by the sheave supports, or from a distant point by means of a flexible shaft, as the operator desires.

The improved transmission embodies a number of additional features of novelty comprising improvements upon those mechanisms which have heretofore been designed or suggested for the accomplishment of somewhat similar functions all of which will be hereinafter described.

In the accompanying drawings:

Figure 1 is a plan view of the transmission, including driving and driven shafts and the intermediate speed ratio varying unit;

Figure 2 is an enlarged view of the speed ratio varying unit, partially in section along the line 2—2 of Figure 3, and partially in elevation;

Figure 3 is a section on line 3—3 of Figure 2;

Figure 4 is a section on line 4—4 of Figure 2;

Figure 5 is a section on line 5—5 of Figure 4;

Figure 6 is a section on line 6—6 of Figure 2; and

Figure 7 is a section on line 7—7 of Figure 6.

The improved transmission is of general utility but may with great advantage be used to transmit power for an electric motor, such as M, to a rotary tool of some sort, such as T, and is so illustrated. The axis of the power delivery shaft of the motor is parallel to the axis of the driven member or shaft of the tool and these shafts carry, respectively, the driving pulley 10 and the driven pulley 11. Endless V-belts are indicated at 12 and 13 respectively, belt 12 encircling and having driving engagement with the motor pulley 10 and the right hand belt receiving groove of the intermediate speed ratio varying unit U, and belt 13 encircling pulley 11 and the second or left hand belt receiving groove of the intermediate unit. These belts are disposed in parallel planes normal to the axes of motor M and tool T and, throughout the operation of the transmission, maintain this fixed spaced relationship with each other, as will hereinafter appear, manipulation of the intermediate speed ratio changing unit U not causing either belt to swing angularly or to otherwise move laterally out of the position in which it is shown in Figure 1.

The sheave members and other moving parts of the speed ratio varying unit are mounted upon a shaft 15 the axis of which is parallel to the axis of the shaft of motor M and to that of the driven shaft. Shaft 15 is supported upon the free end of an arm 16 which projects radially from a hub 17 mounted in a bracket 18 for oscillation about an axis which is also parallel to the axis of the motor and driven shafts. Bracket 18 may be affixed to any suitable fixed base or support.

A tubular member 20 envelops and is slidably supported by the shaft 15 with the end of the tube projecting well beyond the free end of the shaft. Relative movement of tube and shaft, however, is in an axial direction only, a key 21 (Figure 6) secured to shaft 15 adjacent its end projecting into a slot 20a formed in the tube 20, the slot extending longitudinally of the tube. Both the center sheave member, which is indicated at 22, and the outer sheave members 23 and 24 are rotatably supported upon the tube 20 by anti-friction bearings but the center sheave member is held against movement longitudinally of the tube whereas the outer sheave members may be adjusted axially of the tube, it thus being possible, by moving the tube and center sheave member in one direction through a certain distance, and simultaneously moving the outer sheave members the same distance in the opposite direction, to widen one belt receiving notch and narrow the other, thus causing shaft 15 to swing through a small arc about the axis of hub 17 and modifying the speed ratio in known manner but without laterally shifting either belt.

The center sheave member 22 has an axial cylindrical aperture 25 the wall of which faces the outer cylindrical surface of a sleeve 26 which encircles and is concentric with tube 20, three radially disposed key members 27 serving to rigidly mount the sheave member on the sleeve. To further insure rigidity a taper pin 28 is passed through each key 27 and through those portions of the sheave member and sleeve between which that key is positioned, the taper pin being securely held in position by a set screw 28a which bears against its outer end. Each end of the sleeve is formed to receive the outer race 29 of a ball bearing and the inner races 30 of these bearings closely engage the outer surface of tube 20. Sleeve 26 serves to hold the bearings in spaced relation and snap rings 31 prevent the assembly from sliding longitudinally of the tube 20, the center sheave member being thus mounted for free rotation on the tube 20 but constrained to move longitudinally with it, as previously explained.

Associated with the sheave members 23 and 24 is a relatively long sleeve 33 upon which these members are supported in fixed axially spaced relation by means of set screws 34, snap rings 35 and retaining rings 36, secured by screws 37 to the sheave members, or by other suitable securing devices. Sleeve 33 has formed therein three longitudinally extending slots 33a, through which the keys 26 extend, and the outer diameter of the sleeve is smaller than the inner diameter of the center sheave member so that there is ample clearance and no possibility of binding or interference between the sheave members and/ or their respective sleeves. The sleeve 33 is supported upon tube 20 by ball bearings, one at each end of the sleeve. The outer race of each of these bearings is maintained in position within the sleeve by snap rings 40, but the inner races of the bearings, indicated at 41 and 42 respectively, are slidably mounted on tube 20 and are, as may be seen in Figure 2, extended longitudinally in order to have relatively large surfaces in engagement with this tube.

For effecting relative movements of the center and outer sheave members longitudinally of the axis of the supporting shaft 15 manually operable means is provided, such means being designed and positioned to apply an axial force to the sleeve-like inner ball race 42 to move the outer sheave members in either direction and to simultaneously apply an equal force in the opposite direction to the tube 20, to move that tube and the center sheave an equal distance in the opposite direction. This means can be most clearly seen in Figures 2, 4 and 6 of the drawings. The shaft 15 has an axial bore which extends from end to end and this bore rotatably supports and houses the spindle 50. One section 51 of the spindle 50 is threaded and the encircling portion of the cylindrical wall of the bore of shaft 15 is correspondingly threaded so that, when the spindle is rotated, it will move axially of the shaft. Such axial movement of the spindle is communicated to the sleeve-like inner bearing of ball race 42 by means of a cross bar 52 disposed transversely of the spindle and the midportion of which is cylindrically apertured to receive the spindle. The cross bar 52 is constrained to move with the spindle axially of shaft 15 inasmuch as its midportion is confined between the annular flange 53 of the spindle and the face of a cylindrical plug 54 non-rotatably pinned to the spindle by any suitable means.

The outer ends of the cross bar 52 are received in notches 42a formed in bearing member 42 and are maintained in contact with the ends of notches or slots 42a by means of a cylindrical member 56, also provided with notches, indicated at 56a, to receive the ends of cross bar 52, member 56 telescoping bearing member 42 and being secured thereto by pins 57, adjusting screws 58 threaded in cylindrical openings formed in member 56 being provided for the purpose of firmly seating cross bar 52 against the ends of slots 42a after the cylindrical member 56 has been secured in position upon bearing part 42. Key 21 (Figure 6) working in slot 20a of tube 20 prevents rotation of tube 20 upon shaft 15 and, inasmuch as cross bar 52 extends through and is received with a close sliding fit within diametrically opposed longitudinally extending slots 20a and 20b of tube 20, rotation of inner bearing member 42 about the axis of shaft 15 is prevented. Hence tubular member 56 may not rotate about its axis and the end closure disc 60 attached thereto will likewise be non-rotatable.

Tube 20 is moved longitudinally when spindle 50 is rotated, cylindriccal plug 54 fixed upon the spindle having threaded engagement with the correspondingly threaded portion 20c of the tube. The threads upon plug 54 are, however, of twice the pitch and of the same hand as the threads 51 formed upon spindle 50 and, as a result, rotation of spindle 50 causes it to move longitudinally of the shaft 15, carrying bearing 42 and the outer sheave members 23 and 24 with it. The tube 20 will likewise be moved but, because the threads of member 54 which engage the tube are of twice the pitch and of the same hand as threads 51 the tube and center sheave will move in a direction opposite to that at which the spindle 50 is advancing but at twice the rate. It is thus clear that, when spindle 50 is rotated, the outer sheave members and the center sheave member will be moved in opposite directions but at the same rate so that the pitch radius of each belt will be correspondingly varied without, however, changing the distance between belt centers or angularly moving the belts.

Spindle 50 may be rotated by means applied to either end. Thus a knob 62 may be rotatably mounted on closure disc 60 and provided with an axial member 63 provided with a flattened terminal end 63a which is received within a notch or slot formed in the end of spindle 50. A dial 64 may be secured to disc 60 and a pointer 65 may be mounted on the knob to indicate the extent of angular movement of the spindle and the relationship of the sheaves. Or the spindle may be operated by means of a distant control device connected to its other end.

Thus a short spindle-like member 68 rotatably supported in the end of the bore formed in shaft 15 is slotted at 68a to receive the flattened end of spindle 50, connecting these members for simultaneous rotation but permitting free endwise relative movement. At its opposite end member 68 is provided with a recess 68b within which, after removal of closure cap 69, the end of a rotatable flexible shaft may be affixed. Endwise movement of member 68 is prevented by means of a pin 70 which projects into an annular groove 68c in the member and accidental rotation of member 68, due to vibration, and hence accidental rotation of spindle 50, is frictionally prevented by a spring pressed plunger 71, the inner end of which bears upon a knurled section 68d of member 68.

The mechanism is of simple nature while at the same time precise in its functioning and well adapted to operate efficiently over long periods of time without attention.

Having thus described the invention, what is claimed as new and desired to be secured by Letters Patent is:

1. In a variable speed transmission, in combination, a supporting shaft, sheave members encircling said shaft and together defining a belt receiving groove, a tube mounted on the shaft for axial sliding movement relatively thereto, antifriction means interposed between said tube and sheave members respectively, one of said antifriction means being slidable longitudinally on said tube and the other being secured against such movement, and mechanism for relatively moving said sheave members, said mechanism adjustably connecting said shaft to said tube and said shaft to said slidable anti-friction means.

2. In a variable speed transmission, in combination, sheave members defining a belt receiving groove, cylindrical members coaxially arranged in non-contacting relationship for supporting said sheave members, respectively, one such cylindrical member encircling the other and having openings in the wall thereof, elements mounted on the inner cylindrical member and projecting through said openings in the outer cylinder to engage and support one of said sheave members clear of the outer cylinder, the second sheave member being directly mounted on said outer cylinder, anti-friction bearings upon which said cylinders are respectively mounted, and means for relatively shifting said cylinders, each with its associated sheave member and bearing, longitudinally of their common axis to vary the width of the groove.

3. In a variable speed transmission, a pair of cylinders arranged one within the other in spaced coaxial relationship, the wall of the outer cylinder being provided with a plurality of circumferentially spaced axially extending apertures, keys mounted upon the inner cylinder and projecting through said apertures, respectively, two sheave members encircling the outer cylinder and defining a belt receiving groove, one such sheave member being rigidly mounted upon the outer ends of said keys in noncontacting relationship with said outer cylinder, and the second sheave member being directly mounted upon the said outer cylinder, and mechanism for supporting said cylinders and sheave members for rotation about a common axis and for relatively adjusting them longitudinally of said axis, for the purpose set forth.

4. In a variable speed transmission, a pair of cylinders arranged one within the other in spaced coaxial relationship, the wall of the outer cylinder being provided with a plurality of circumferentially spaced axially extending apertures, keys mounted upon the inner cylinder and projecting through said apertures, respectively, two sheave members encircling the outer cylinder and defining a belt receiving groove, one such sheave member being rigidly mounted upon the outer ends of said keys in noncontacting relationship with said outer cylinder, and the second sheave member being directly mounted upon the said outer cylinder, an anti-friction bearing within each end of each cylinder, and means for supporting said bearings and for relatively axially adjusting the cylinders and the associated supporting bearings to vary the width of said belt receiving groove.

5. In a variable speed transmission, in combination, coaxial inner and outer cylinders, one encircling the other but out of contact therewith, anti-friction bearings supporting said cylinders, respectively, at their ends, the outer cylinder being longer than the inner cylinder and the midsection thereof being longitudinally slotted, a center sheave member encircling the midsection of the outer cylinder but out of contact therewith, keys mounted on the inner cylinder and projecting through the slots in the outer cylinder to engage and support said center sheave member, spaced outer sheave members encircling the outer cylinder and disposed, respectively, upon opposite sides of said center sheave member to define therewith two belt receiving grooves, and mechanism for supporting said cylinders for rotation about their common axis and for relatively adjusting them longitudinally of said axis.

6. In a variable speed transmission, in combination, coaxial inner and outer cylinders, one encircling the other, anti-friction bearings supporting said cylinders, respectively, at their ends, the outer cylinder being longer than the inner cylinder and the midsection thereof being longitudinally slotted, a center sheave member encircling the midsection of the outer cylinder but out of contact therewith, keys mounted on the inner cylinder and projecting through the slots in the outer cylinder to engage and support said center sheave member, spaced outer sheave members encircling the outer cylinder and disposed, respectively, upon opposite sides of said center sheave member to define therewith two belt receiving grooves, and mechanism for supporting said cylinders for rotation about their common axis and for relatively adjusting them longitudinally of said axis, said mechanism including a tube upon which all four of said anti-friction bearings are mounted.

7. In a variable speed transmission, in combination, coaxial inner and outer cylinders, the outer cylinder being longer than the inner cylinder and the midsection thereof being longitudinally slotted, a center sheave member encircling the midsection of the outer cylinder but out of contact therewith, keys mounted on the inner cylinder and projecting through the slots in the outer cylinder to engage and support said center sheave member, spaced outer sheave members encircling the outer cylinder and disposed, respectively, upon opposite sides of said center sheave member to define therewith two belt receiving grooves, and mechanism for supporting said cylinders for rotation about their common axis and for relatively adjusting them longitudinally of said axis, said mechanism including a shaft, a tube mounted on said shaft for longitudinal movement relatively thereto, bearings slidably mounted upon said tube and disposed to support the outer cylinder, bearings mounted upon said tube, for longitudinal movement with the tube, to support the inner cylinder, and means for sliding said first mentioned bearings and outer cylinder along the tube in one direction while moving the tube longitudinally of the shaft.

8. The combination set forth in claim 7 in which said last mentioned means includes a spindle having threaded relation to the shaft, threaded means connecting the spindle and tube, and a member operatively connecting the spindle and one of the bearings which supports the outer cylinder.

9. The combination set forth in claim 7 in which said shaft is hollow and is interiorly threaded, and in which said last mentioned means includes a spindle disposed within the hollow shaft and having threaded relation therewith, a bar disposed transversely of the spindle and the ends of which are operatively connected to one bearing of the outer cylinder, means preventing relative longitudinal movement of the bar with respect to the spindle while permitting rotation of the spindle, and a member fixed on the spindle and having threaded relation to said tube, whereby the tube is moved axially, when the spindle is rotated, in a direction opposite to that in which the spindle is moving.

References Cited in the file of this patent

UNITED STATES PATENTS

| | | |
|---|---|---|
| 1,854,018 | Carlberg | Apr. 12, 1932 |
| 2,253,921 | Van Sant | Aug. 26, 1941 |
| 2,348,994 | Otto | May 16, 1944 |
| 2,464,841 | Alexander | Mar. 22, 1949 |

FOREIGN PATENTS

| | | |
|---|---|---|
| 885,742 | France | Sept. 23, 1943 |